United States Patent [19]

Slayton et al.

[11] Patent Number: 4,788,572
[45] Date of Patent: Nov. 29, 1988

[54] BELT CONTROLS FOR A PRINT ENGINE FOR COLOR ELECTROPHOTOGRAPHY

[75] Inventors: Danny L. Slayton, Lilburn; E. Neal Tompkins, Roswell, both of Ga.; Charles S. Palm, Pasadena, Calif.; Kirk W. Charles, Atlanta, Ga.; David R. Davis, Buford, Ga.; Peter Zuber, Norcross, Ga.

[73] Assignee: Colorocs Corporation, Norcross, Ga.

[21] Appl. No.: 28,973

[22] Filed: Mar. 23, 1987

Related U.S. Application Data

[63] Continuation-in-part of Ser. No. 791,218, Oct. 25, 1985, Pat. No. 4,652,115.

[51] Int. Cl.$^4$ .................... G03G 15/14; G03G 15/16
[52] U.S. Cl. ................ 355/3 TR; 355/3 BE; 355/14 TR
[58] Field of Search ............. 355/3 TR, 3 TE, 3 BE, 355/3 DR, 14 R, 14 TR, 15, 16

[56] References Cited

U.S. PATENT DOCUMENTS

| | | | |
|---|---|---|---|
| 3,981,578 | 9/1976 | Heinzer | 355/16 |
| 4,110,033 | 8/1978 | Ophey | 355/14 R |
| 4,252,432 | 2/1981 | Ophey | 355/14 R |
| 4,330,194 | 5/1982 | Murakami | 355/16 X |
| 4,541,709 | 9/1985 | Kampschreur | 355/3 TR |
| 4,592,641 | 6/1986 | Roelofs et al. | 355/14 TR X |
| 4,662,739 | 5/1987 | Sakai et al. | 355/14 R |
| 4,705,385 | 11/1987 | Palm et al. | 355/3 BE X |

OTHER PUBLICATIONS

Adams, Ralph J., Ling, Chester H., Monkelbaan, Edwin R., "Welded Xerographic Belts", Xerox Discl Journal, vol. 2, No. 6, Nov./Dec. 1977, p. 53.

Primary Examiner—A. C. Prescott
Assistant Examiner—Jane Lau
Attorney, Agent, or Firm—Jones, Askew & Lunsford

[57] ABSTRACT

Improved dual belt synchronization for a print engine for color electrophotography using a photoreceptor belt and a seamless transfer belt on which a composite image is built up. Improved synchronization of the two belt drives enhances image registration. A tension mechanism used in conjunction with the belts prevents rapid changes in the belt dimensions. An improved transfer belt cleaner system is synchronized with the belt drives such that excess toner is not left in the imaging area of the transfer belt.

4 Claims, 5 Drawing Sheets

BELT CONTROLS FOR A PRINT ENGINE FOR COLOR ELECTROPHOTOGRAPHY

TECHNICAL FIELD

The present invention relates to print engines for electrophotography and particularly discloses an improved belt control mechanism, having a plurality of individual improvements, which synchronizes the operation of two independently driven belts. This application is a continuation-in-part of U.S. application Ser. No. 791,218 filed Oct. 25, 1985, entitled "Improved Print Engine For Color Electrophotography", now U.S. Pat. No. 4,652,115.

BACKGROUND OF THE INVENTION

Electrophotography is a dry copy process whereby copies of documents are made by setting up an electrostatic image of an original document and transferring that image to copy paper. Also known as xerography, electrophotography has become a standard process for creating copies of documents in a host of environments including offices, educational institutions and the like. The fundamental principles of electrophotography are well known to those skilled in the art.

In more recent years, systems for color electrophotography have been created. In many respects, the process of color electrophotography is analogous to standard three-color printing processes used in the more conventional printing arts. Conventional three-color printing component images, commonly referred to as color separations, are created by photographing the original through appropriate filters. Each of the separations is in turn made into a separate printing plate. During the printing process, each plate is inked with an appropriate color determined by the filter used in making the original separation. The printing press is adjusted for proper registration--alignment of the separate color component images with each other. Once the press is properly adjusted, multiple copies of the original color image may be faithfully reproduced.

As is known to those skilled in the art, in monochromatic electrophotography an optical image of an original to be copied is focused onto an electrostatic medium. An electrostatic image of the original is formed on the electrostatic medium, or photoreceptor. Toner materials are then brought into contact with the photoreceptor and held in place on the appropriate portions of the electrostatic image by electrostatic forces. The photoreceptor carrying the electrostatic image is brought into contact with an image receptor which, in the most common applications of electrophotography, is a sheet of paper. Electrostatic charging techniques are used to transfer the toner from the photoreceptor to the image receptor. The toner materials are normally plastics which melt at a predetermined temperature and have appropriate color characteristics once they are melted. The image receptor with these toner particles is passed through a fuser, which is a station in the path of the image receptor. The fuser heats the transferred toner and thereby fixes the image onto the image receptor.

In color electrophotography, three separate color filters are typically used to create three separate color component images in a manner analogous to the creation of color separations in color printing. Each image is developed with a toner having the appropriate color characteristics. Each developed color component image is in turn transferred to the image receptor and overlaid upon the previous image to provide a composite image. The image receptor, typically paper, carrying the composite image is then passed through a fuser in a conventional manner.

It is known in the art of color electrophotography to include an intermediate transfer medium upon which each developed color component image is deposited, between the above-described photoreceptor and the ultimate image receptor or paper. In this way, a composite developed image is built up, one color component image at a time, until an overlaid composite color image, having portions of all three of the color component toners thereon, is created on the transfer medium. Once this is accomplished, the composite image on the transfer medium is transferred to the paper which then passes through the fuser in the normal fashion.

As noted above, color electrophotography or color xerography, is conceptually quite similar to conventional color printing. However, there is a significant difference in the economics of scale. Most importantly, color printing is rarely undertaken for small numbers of copies. In practical color printing environments, the person controlling the color printer normally has ample opportunity to make sure the elements of the press are properly aligned so that proper registration is obtained. In the absence of proper registration, the individual color component images are misaligned and the result is a fuzzy image, with edges of objects being outlined inappropriately with portions of one of the color components.

However, in typical color electrophotography environments, the user is in a hurry. He may need only one or two copies and generally he has neither the training or inclination to adjust for proper registration. Therefore, in prior art color electrophotographic machines, the mechanical elements carrying the photoreceptor medium, the intermediate transfer medium, if used, and the paper have had to be machined to extremely close tolerances in order to maintain proper registration.

In the prior art, this has only been practical by using relatively large drums to carry the photoreceptor and critically machined, and therefore expensive, gearing arrangements by which the entire mechanism is driven from a common prime mover. Naturally, as these mechanical components age and the mechanical elements controlling registration suffer wear, registration, and therefore copy quality, suffers significantly. Therefore, maintenance of critical mechanical alignments in prior art full color electrophotographic systems have been one of the principal factors in keeping the cost of such machines very high with respect to the cost of monochrome copiers.

From the foregoing it will be appreciated that the prior art has not produced a full color print engine which will maintain the critical registration necessary to produce accurate full color copies by overlaying separate color component images without the use of relatively expensive finely machined mechanical parts.

SUMMARY OF THE INVENTION

The present invention overcomes the above-stated technical problems in the prior art in a number of significant aspects. Broadly stated, the present invention provides a full color print engine for an electrophotographic process which includes a conventional photoreceptor for developing color component images and an intermediate transfer medium for developing a composite image, these two elements being implemented with noncritically machined surfaces. In the preferred form of the present invention, the photoreceptor and the intermediate transfer medium are both carried on flexible belts. Each belt is independently driven by a direct current electric motor. The passage of an index mark on each belt past a predetermined reference point is read by an optodetector pair, composed of a light-emitting diode and a phototransistor to detect quantified movement of the belts. The present invention employs a precision digital electronic controller for synchronizing the mechanical movements of the two belts to assure proper registration of the color component images when the composite image is formed.

In the present invention, the length of one of the belts is nominally an integer submultiple of the length of the other. In the preferred embodiment, the belt carrying the photoreceptor is approximately twice the length of the intermediate transfer belt. However, it should be understood that as used in the specification, the concept of an integer submultiple includes a value of one wherein the belts are nominally of the same length. The photoreceptor belt rotates about two rollers with relatively small radii compared to the overall belt length. The intermediate transfer belt rotates around three rollers and is positioned to partially wrap around one of the photoreceptor belt rollers at the point where the two belts contact. This provides a surface area, preferably in excess of one-half inch along the direction of travel of the belts, at which the two belts are in intimate contact while the color component images from the photoreceptor are being transferred to the intermediate transfer belt. By proper selection of surface charge density and polarity, very strong electrostatic binding forces are created between the two belts which aid in maintaining proper registration during the image transfer.

An additional novel mechanism is used for maintaining proper registration between the photoreceptor belt and the intermediate transfer belt. The speeds of the two belts are synchronized so that, around the roller where the contact is made, the angular velocity of the photoreceptor belt equals the angular velocity of the transfer belt. In prior embodiments, the belts would have to be adjusted periodically due to the fact that when traveling at identical linear velocities the transfer belt would travel more slowly around the roller than the photoreceptor belt. This was because the transfer belt had to travel around a larger radius than the photoreceptor belt. By synchronizing angular velocities of the belts around the roller, the need for periodic readjustment is eliminated.

Another improvement of the present invention is the regulation of the contact length of the two belts. It is preferred that the contact length of the transfer belt where it wraps around the photoreceptor belt be much longer than the width of the case of the transfer corona which applies electrostatic charge in the contact area. The angle of corona charge is determined by the width of the case of the corona. The charge placed on the transfer belt should cover a portion of the transfer belt smaller than the length of the transfer belt which contacts the photoreceptor belt. If more of the transfer belt were charged than contacts the photoreceptor belt, transfer of the electrostatic image to the transfer belt would begin prior to the contact portion of the belts. This would cause distortion and smearing of the electrostatic image.

According to another aspect of the present invention, the belts are synchronized such that every time the seam of the photoreceptor belt passes the belt-to-belt contact point it contacts the defined seam on the transfer belt. If a seam appears in the imaging portion of the photoreceptor belt, it causes distortion of the electrostatic image. Thus, the present invention assures that the imaging area on the photoreceptor belt never includes the seam. Likewise, if the defined seam of the transfer belt contacts an active imaging area of the photoreceptor belt, distortion of the image results. In the preferred embodiment, the transfer belt is a seamless belt and a non-imaging area is defined on the seamless transfer belt to come into contact with the seam of the photoreceptor belt, which is out of the photoreceptor belt imaging area, each time that seam passes the contact point. Instead of periodic readjustment, the defined seam on the transfer belt is redefined after a copy is made. As copies are made, the imaging area on the photoreceptor belt moves laterally along the belt. Likewise, the defined seam on the transfer belt moves laterally along the belt. When the imaging area approaches the seamed portion of the belt, the imaging area on the photoreceptor and the defined seam on the transfer belt are electronically redefined.

Another aspect of the present invention is an oblique-angled seam on the photoreceptor belt. The seam of the photoreceptor belt is an oblique angle in order to prevent early deterioration of the seam material of the belt giving the belt a longer life expectancy. Since the cleaning blade is placed against the belt to remove residual toner, the impact between the blade and the seam is lessened by the seams coming into contact with the blade bit-by-bit. Thus, the oblique angle not only prevents early deterioration of the photoreceptor belt, but also prevents damage to the cleaning knife. In addition, by lessening the impact of the seam against the blade the amount of residual toner becoming airborne inside the machine and dusting the inside of the machine is greatly reduced. Also, the seam is constructed in such a manner that the blade, when coming into contact with the seam, travels along the belt material and drops down over the seam instead of having the seamed material strike the blade forcing it up.

According to another aspect of the present invention, a spring and a unidirectional cam are used to maintain a constant tension on the photoreceptor belt and the transfer belt. By maintaining a proper (or desired) tension on the belts, instantaneous deviations in the length of a belt from its optimum length are minimized and consistent and proper registration is maintained.

Another aspect of the spring and cam arrangement is to allow tension to be removed from the belt to aid belt replacement. The mechanical arrangement of the cam and belt removal knob allows the cam to be removed from its tensioning position before the rollers are released so that the belt may easily be removed from the rollers. Once a new belt is placed upon the rollers, the reverse method is used to place tension upon the new belt by applying tension to the roller and then dropping the cam into position so that the roller is held firm.

Yet another improvement of the present invention is an improved transfer belt cleaner knife. This knife has an active and a rest position. In the rest position, the knife does not contact the transfer belt. During color copying, the knife is in the rest position while the composite image is being built up. After the full color composite is transferred to the image receptor, the knife goes into the active position. In the active position, the knife contacts the transfer belt to remove residual toner. Since the point where the knife disengages with the transfer belt leaves a "streak" of toner, the knife is engaged/disengaged at a point which is the defined seam (or on a seamed transfer belt, the actual seam). The defined seam (or the actual seam) is the point which contacts the photoreceptor belt seam and is outside of the imaging area.

According to yet another aspect of the present invention, the improved transfer belt is manufactured such that the bulk resistivity of the belt is $10^8$ to $10^{12}$ ohms-centimeters. The transfer belt must be insulative so that the first corona device can cause the toner to be pulled from the photoreceptor belt to the transfer belt, and so that the second corona device can cause the toner to be pulled from the transfer belt to the image receptor. If the conductivity is too high, the corona devices will not be able to pull the toner as needed. But, the transfer belt must also be conductive so that the grounding pad can discharge any residual charge on the transfer belt. If the conductivity is too low, the grounding pad will not be able to discharge the belt and an accumulating residual charge will remain on the belt. If the residual charge gets too strong, it will prematurely pull toner from the photoreceptor belt to the transfer belt, and prevent the proper transfer of the toner from the transfer belt to the paper. It has been found that the bulk resistivity of $10^8$ to $10^{12}$ ohms-centimeters is ideal for the transfer belt. This resistivity allows the corona devices to properly transfer the toner, and allows the grounding pad to promptly discharge the belt.

Therefore, it is an object of the present invention to provide improved belt control systems to be used in a color electrophotographic machine. It is a further object of the present invention to produce accurate full color copies by improved registration without the use of relatively expensive finely machined mechanical parts.

It is a further object of the present invention to synchronize the angular velocity of the two belts around the roller in the contact area to eliminate the need for periodic readjustments of the belts.

It is another object of the present invention to minimize dusting in the machine and maximize longevity of the seamed belt by constructing the seam of the belt at an oblique angle.

It is a further object of the present invention to maintain consistent and proper registration by keeping a constant tension on the photoreceptor belt and the transfer belt.

It is a further object of the present invention to facilitate belt replacement by providing a mechanism to remove the constant tension components and then release the rollers so that the belt may easily be removed and a new belt placed over the rollers.

It is also an object of the present invention to synchronize the operation of the transfer belt cleaner knife such that it only removes residual toner after the composite image has been transferred to the ultimate image receptor and that it does not leave a streak of toner in the imaging area of the transfer belt.

Finally, it is a further object of the present invention to provide that the transfer belt is manufactured from a material with a bulk resistivity that improves the toner transfer performed by the corona devices while also improving the discharge of the transfer belt by the grounding pad.

That the present invention accomplishes these objects and overcomes the drawbacks of the prior art will be appreciated from the detailed description of the preferred embodiment to follow.

DETAILED DESCRIPTION

Turning now to the various drawing figures, in which like numerals reference like parts, a detailed description of the preferred embodiment will be provided.

The improvements recited herein relate to the preferred embodiment of the invention described in patent application Ser. No. 791,218 by Palm et al., entitled "IMPROVED PRINT ENGINE FOR COLOR ELECTROPHOTOGRAPHY", filed Oct. 25, 1985, which specification is incorporated herein by reference.

The preferred embodiment of the invention relates to a dual-belt electrostatic transfer system for use in a laser printer or a color electrophotographic copier print engine. From the following description of the preferred embodiment, it will be appreciated that other alternative embodiments will suggest themselves to those skilled in the art.

Figure 1:
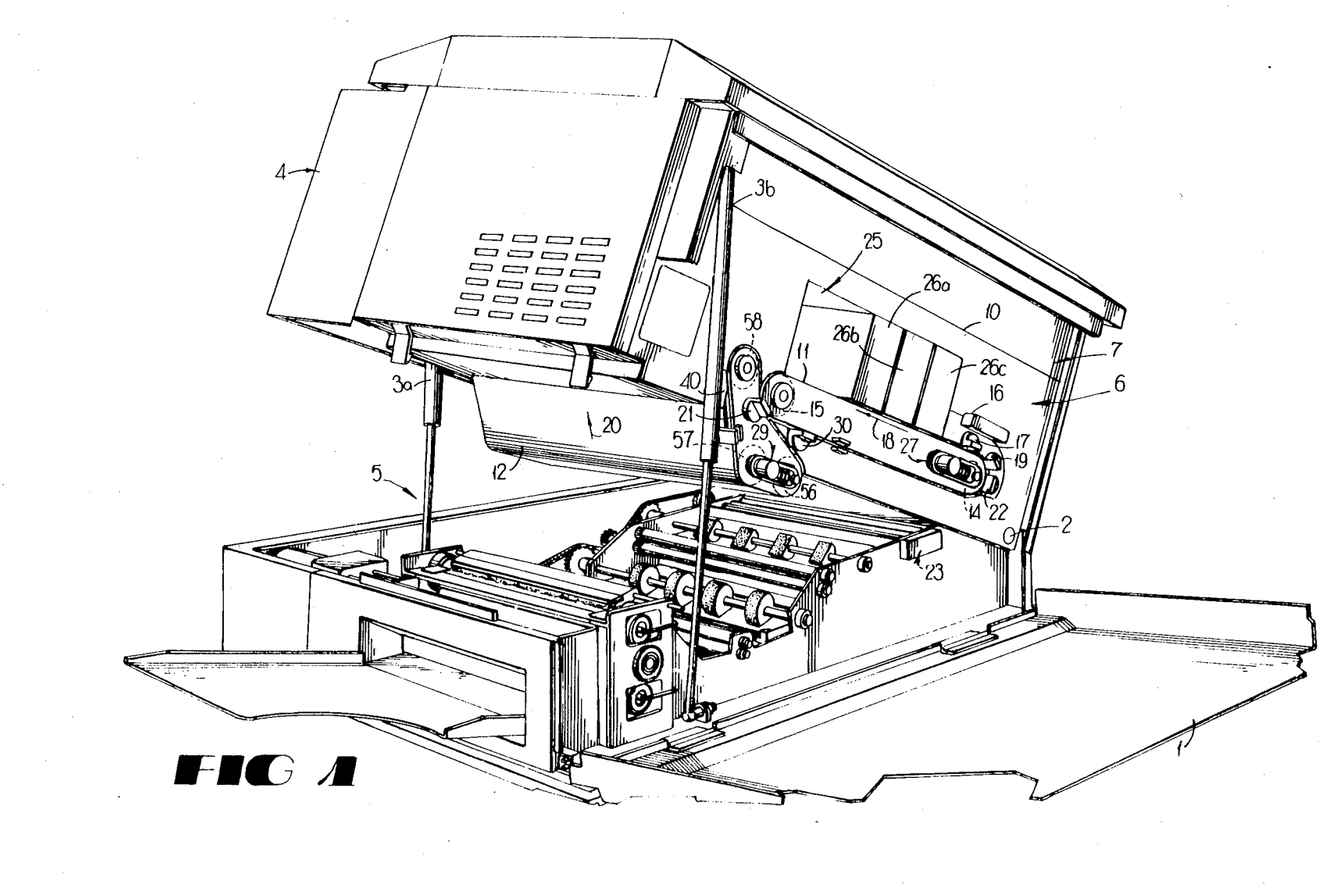
FIG. 1 is a perspective representation of a color electrophotography machine showing the dual belt transfer system.

FIG. 1 shows a perspective view of the preferred embodiment of the invention. Side panel 1 is lowered, and an upper portion 4 of the machine is raised. The upper portion 4 of the machine is hinged about an axis shown as 2 and is supported by a pair of spring-loaded telescoping rods 3a and 3b. The machine depicted can either be a laser printer or an electrophotographic table top copier. The lower part of the machine is the paper handling assembly, generally indicated at 5. The upper portion of the machine includes an image developing portion 6. In a copier, the machine includes an optical bench 7 joined to the image developing portion 6 at 10.

In the preferred embodiment, the image developing portion 6 contains photoreceptor belt 11 and transfer belt 12. Photoreceptor belt 11 is driven around rollers 14 and 15 by a motor (not shown). Transfer belt 12 is driven around rollers 56, 57 and 58 by a separate motor attached to roller 58 (not shown).

A conventional expose station of photoreceptor belt 11 is shown at 16. This includes exposure corona devices 19 and 22 of a type well known to those skilled in the art. Corona devices 19 and 22 are used for providing an electrostatic charge to photoreceptor belt 11. Expose station 16 also includes discharging scoratron 17 to define an electrostatic image on photoreceptor belt 11. Transfer belt 12 wraps around photoreceptor belt 11 where belt 11 wraps around roller 15. Transfer of the developed image from photoreceptor belt 11 to transfer belt 12 occurs in the wrap of belts 11 and 12. In the preferred embodiment, photoreceptor belt 11 rotates in a counterclockwise direction (when looking through lowered side panel 1), as indicated by arrow 18, and transfer belt 12 rotates in a clockwise direction indicated by arrow 20. A corona device is located at position 21 to assist in the transfer of the image from photoreceptor belt 11 to transfer belt 12.

A belt cleaner blade 34 (shown in FIG. 2) is provided at cleaning station 23 along photoreceptor belt 11. Any toner which remains on photoreceptor belt 11 after a developed image has been transferred to transfer belt 12 is collected in receptacle 38 (FIG. 2) of cleaning station 23 in a conventional manner.

Likewise, transfer belt cleaner knife 37 (shown in FIG. 2) is located at cleaning station 40. After the composite image formed on transfer belt 12 is transferred to an image receptor at position 33, transfer belt cleaner blade 37 (shown in FIG. 2) is activated to remove the residual toner from transfer belt 12. The toner is collected in a receptacle contained in cleaning station 40 in a conventional manner. The image receptor passes from transfer position 33 into fuser 36 where the toner is affixed to the image receptor in a manner well known in the art.

Located above photoreceptor belt 11 is an open space 25 for housing toner modules. In the preferred embodiment, space 25 has room for housing 5 toner modules. In FIG. 1, three toner modules 26a through 26c are shown installed within space 25.

A spring and cam arrangement 27 maintains a constant tension on photoreceptor belt 11. Likewise, a similar spring and cam arrangement 29 keeps constant tension on transfer belt 12. In the preferred embodiment, photoreceptor belt 11 is approximately 38 inches long and transfer belt 12 is approximately 19 inches long, nominally an integer submultiple of 38 inches. It will now be appreciated from an inspection of FIG. 1 that the use of flexible belts in the preferred embodiment allows a full color print engine to be constructed so that the size approximates that of a conventional convenience monochrome table top copying machine.

Figure 2:
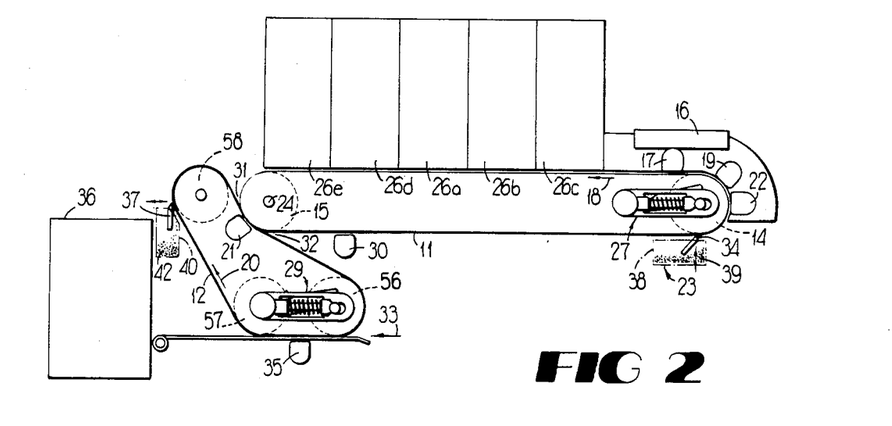
FIG. 2 is a drawing of the dual belt system.

Turning next to FIG. 2, a detailed drawing of the belt arrangement in the preferred embodiment is shown. Photoreceptor belt 11 is mounted about a pair of rollers 14 and 15. Associated with the mechanical elements carrying belt 11 is the tension adjusting cam and spring arrangement 27 attached to roller 14. This cam is loosened when belt 11 is to be removed, and is used to properly tension photoreceptor belt 11 after installation. Likewise, proper tension is maintained on transfer belt 12 by the tension adjusting cam and spring arrangement 29 attached to roller 56.

A plurality of corona devices 17, 19 and 22 are located at expose station 16. Corona devices 22 and 19 generate sensitizing coronas used to charge belt 11 prior to creation of the electrostatic image. Corona device 17 is a discharging scoratron used in the imaging process. On the lower side of photoreceptor belt 11, an AC corona device 30 is located. Corona device 30 is excited with an alternating current voltage which tends to disperse charge remaining on the belt and thus loosen any residual toner particles which may be left on the belt after transfer of the developed image to transfer belt 12. The particles can therefore be removed by scraper blade 34 and deposited in receptacle 38 of cleaning station 23.

Extending over the edge of belt 11 is optodetector pair 61a, a conventional device which includes a light-emitting diode (LED) illuminating the surface of belt 11 and a phototransistor positioned on the opposite side of belt 11 from the LED. Each time index notch 60a (shown in FIG. 4) passes between the LED and the phototransistor of optodetector 61a, an output pulse from the phototransistor is provided to the control system. In this manner, the control system can track the speed and position of various points on belt 11. Of particular importance, the location of seam 52 is known by the pulsing of optodetector pair 61a. Due to the construction of photoreceptor belt 11 and seam 52, it is necessary to synchronize expose station 16, toner modules 26a through 26e and the speeds of photoreceptor belt 11 and transfer belt 12 such that no part of any image will be defined on seam 52. Deposited toner will lay unevenly on seam 52 as will electrostatic charge so that any image which is defined on belt 11 such that it covers seam 52 will appear distorted in the final image. Likewise, an optodetector pair 61b is located on transfer belt 12 such that it can send a pulse to the control system every time index notch 60b passes optodetector pair 61b. In this manner, the speeds and position of contact of photoreceptor belt 11 and transfer belt 12 are controlled electronically.

As photoreceptor belt 11 moves past expose station 16 light from optics bench 7 (FIG. 1) is focused onto the belt in synchronization with its movement to produce an electrostatic image on the photoreceptor belt. Assume for the moment that color copying is taking place. Toner modules 26a through 26c contain the three color process toners. When developing the first color component image, an appropriate separation filter (not shown) is interposed between the light source and the optics bench and expose station 16 in a known manner. As belt 11 moves past expose station 16 in the direction shown by arrow 18, an electrostatic image of this particular color component is created on belt 11 in a manner which will be familiar to those skilled in the art, and which was described in the background of the invention.

Assume that the first color developed corresponds to the color contained in toner module 26a. As a developed image moves past toner module 26a, the module is activated to deposit toner materials on the charged portions of the surface of belt 11 to provide a developed image of this color component. As belt 11 continues to rotate, the leading edge of the developed image eventually reaches point 31 at which point belt 11 first makes contact with belt 12. The developed image is transferred from belt 11 to belt 12 as the belts continue to rotate around roller 15 from point 31 to point 32. Belt 11 is urged firmly against belt 12 with only corona device 21 located in the open space behind the portion of belt 12 which contacts belt 11. Corona device 21 enhances the electrostatic transfer of the developed image from belt 11 to belt 12. The contact area between points 31 and 32 is referred to herein as the wrap of the belts. In the preferred embodiment, the length along the direction of travel of belt 11 of the wrap area between points 31 and 32 is approximately 0.6 inches and in excess of 30 degrees of arc in the cross-section of the wrap of the belts.

Two mechanisms resulting from the wrap area of the belts aid transfer of the image and maintenance of proper registration. First, a considerable mechanical force is provided in the wrap area simply from the force of having belt 11 urged strongly into belt 12, as shown. Secondly, belt 12 is charged to a high positive potential by corona device 21 so that belt 12 has approximately 1 kilovolt of electrostatic potential as a result of the positive surface charge. This surface charge causes the toner material on belt 11 to be transferred to belt 12, thus transferring the developed image.

Considering a 1 kilovolt surface charge potential on belt 12 and the intimate contact between belts 11 and 12 in the wrap area between points 31 and 32, it will be quickly appreciated that a very intense electric field strength exists in the wrap area. This helps hold belt 11 and 12 tightly together and prevents any slip from occurring as composite images are laid one over the other. Further, to prevent slippage during the transfer of the composite images, the speeds of belt 11 and belt 12 are synchronized such that the angular velocity of belt 11 in the wrap area around roller 15 is equal to the angular velocity of belt 12 in the wrap area around roller 15.

Once approximately one-half of belt 11 has passed expose station 16 after development of a first color component image, the second separation filter is inserted in the optical path and an electrostatic image of a second color component of the original is exposed on photoreceptor belt 11. Toner module 26b is activated as this electrostatic image passes under it in order to provide a second color component developed image. This second image is then transferred to belt 12, overlaid onto the first image, as the third color component image is being developed. The third color component developed image is then transferred to belt 12 and overlaid onto the first and second images to produce the three color composite developed image.

It should be noted that belt 11 is of sufficient length so that, for conventional 8½×11-inch or 8½×14-inch copies, a next electrostatic image is being developed on one portion of belt 11 as the prior developed image is being transferred to belt 12. Therefore, one and one-half revolutions of belt 11 are required to create, develop and transfer a three-color composite developed image during three rotations of transfer belt 12. It should also be noted that the operation of optics bench 7 and the movement of belt 11 are synchronized such that seam 52 of belt 11 never passes under expose station 16 while an image is being exposed on belt 11 for the reasons stated above. It should also be noted that the movement of belt 11 and the movement of belt 12 are synchronized such that seam 52 of belt 11 contacts defined seam 63 (FIG. 4) on belt 12 during each rotation of belt 11.

Once a complete composite image has been transferred to transfer belt 12, an image receptor, normally a piece of paper, is provided by a mechanical means known to those skilled in the art to a transfer station at 33. The composite image is then transferred from transfer belt 12 to the image receptor. An electrostatic charge is placed upon the receptor by corona device 35 to assist in the transfer of the composite image. Once the image is transferred to the paper, the paper then proceeds by mechanical means into fuser 36. In fuser 36, the image is affixed to the image receptor in a manner well known in the art.

A transfer belt cleaner knife 37 is pictured in the disengaged position. After the composite image has been transferred from transfer belt 12 to the image receptor, cleaner knife 37 goes into the engaged mode making contact with transfer belt 12. Cleaner knife 37 scrapes excess toner from belt 12 and deposits it in receptacle 40. After one revolution of belt 12, knife 37 is disengaged from belt 12 and remains disengaged until another composite image is transferred from belt 12 to the paper. In the preferred embodiment belt 12 is a seamless belt and knife 37 is synchronized to engage and disengage at a point on belt 12 which comes into contact with the seam of belt 11 in the wrap of the belts. During color copying, knife 37 engages belt 12 for one full revolution after two revolutions in the disengaged position.

In the preferred embodiment, there are three to five toner modules located above belt 11, pictured as 26a through 26e. Toner modules 26a through 26c contain the three color process toners. Module 26d contains a monochromatic black toner for high speed monochromatic copying. It will be appreciated that monochromatic copying produces three copies in the time it takes the color process to produce one copy. Toner module 26e is for custom color toner which contains customized toner particles to produce a color that the purchaser uses frequently in letterheads, logos, or advertisements.

Figure 3:
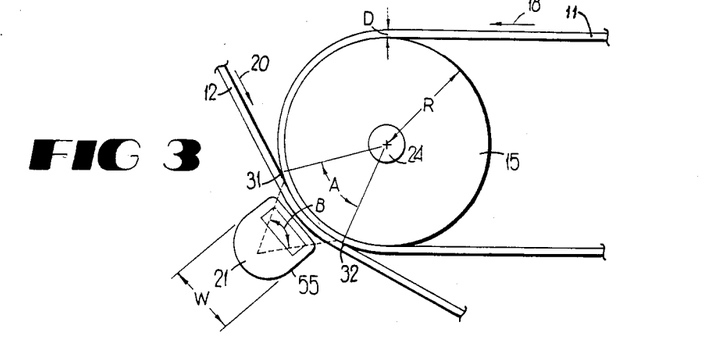
FIG. 3 is a drawing of the contact point between the photoreceptor belt and the transfer belt.

Turning next to FIG. 3, a detailed view of the geometry of the area of the wrap of the belts is described. Belt 11 is moving in direction 18 as it passes around roller 15 with an axis of rotation 24. Belt 12 travels in direction 20 and is in contact with belt 11 across an arc from point 31 to point 32. This arc is described as angle A. The speeds of belt 11 and belt 12 are synchronized such that belt 12 travels around the wrap of the belts at the same angular velocity as belt 11.

In the preferred embodiment, angle A is in excess of 30 degrees and the length of the wrap area between points 31 and 32 is approximately 0.6 inches. It is necessary that this contact length of transfer belt 12 to photoreceptor belt 11 be much longer than the width of transfer corona case 55, shown as W. The dispersal of charge from corona 21 is determined by width W and the location of corona 21 within transfer corona case 55. This angle of dispersal is shown as angle B. It is preferred that angle B be less than angle A. Thus, the concave arc proscribed by angle B upon the wrap of the belts is less than the length of the wrap of the belts from point 31 to point 32.

If the concave arc proscribed by B was longer than the wrap of the belts, charge would be applied to transfer belt 12 outside of the wrap of the belts and would have the detrimental affect of causing transfer of the electrostatic image from belt 11 to belt 12 before the belts have come into contact at point 31. This causes double imaging, smearing and uneven transfer of the electrostatic image. It also causes improper registration. It will be appreciated that keeping angle B less than angle A will increase proper registration.

In order to achieve proper registration, it is also necessary to synchronize belts 11 and 12. However, synchronizing the speeds of the two belts such that they travel at the same linear velocity necessitates jerking or shifting the two belts periodically in order to maintain proper seam contact and proper registration. Since belt 12 has to travel an arc $A(R+D)$ while belt 11 only has to travel an arc $AR$, if belts 11 and 12 have the same linear velocity then belt 12 will take longer to traverse $A(R+D)$ than belt 11 will take to traverse $AR$. Therefore, belt 12 will slip with respect to belt 11 and proper registration will not be maintained. Thus, belts 11 and 12 must traverse their respective parts in the same length of time in order to maintain proper contact and proper registration during the transfer. More precisely, the angular velocity of belts 11 and 12 must be the same between points 31 and 32.

With an angular velocity W, and radius R for roller 15, belt 11 will be traveling at speed W×R. The thickness of belt 11 is D. As mentioned above, the angular velocity of belt 12 is W, the same as that of belt 11. Thus, belt 12 will be traveling at speed W(R+D) or WR+WD. The difference between the speed of transfer belt 12 and the speed of photoreceptor belt 11 is angular velocity (W) multiplied by the thickness (D) of belt 11. Belt 12 will therefore have a linear velocity of (1+D/R) times the linear velocity of belt 11.

Figure 4:
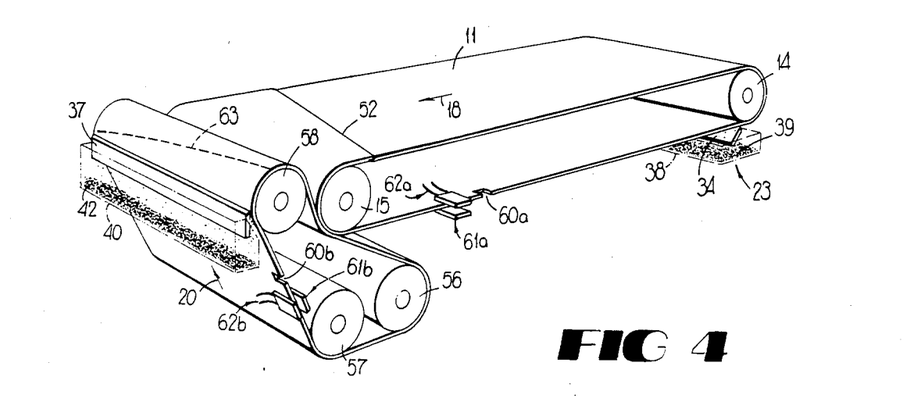
FIG. 4 is a simplified diagramatic perspective of the dual belt transfer system and the belt cleaning systems.

FIG. 4 is a simplified diagramatic perspective of the dual belt transfer system and the belt cleaning systems. Photoreceptor belt 11 has a manufactured seam 52. Seam 52 is manufactured such that it forms an oblique angle on belt 11. The oblique-angled seam 52 and the manufacture of seam 52 wherein a portion of one end of the belt is overlaid upon a portion of the other end of the belt allows for a benign contact between the belt and photoreceptor belt cleaning knife 34. The overlay of the ends of belt 11 are seamed in such a manner that with the rotation of belt 11, cleaning knife 34 will not strike a new end of the belt. Instead, it will drop off from the old end onto the new part of the belt. A non-benign contact between belt seam 52 and cleaning knife 34 would cause a deterioration of the seamed material of the photoreceptor belt. Also, it could cause damage to cleaning knife 34. Also, a hard contact between the belt seam and the blade would cause toner to dust the inside of the machine by becoming airborne from the shock of the impact to belt 11.

Optodetector pair 61a is constructed of a light-emitting diode (LED) on the opposite side of the belt from a phototransistor. This pair will send a reference signal via wires 62a to the electronic control mechanism in response to notch 68 passing between the pair. Optodetector pair 61b is constructed in a similar manner. The electronic control mechanism receives the signals from pair 61a and 61b, processes those signals in a manner well known in the art, and synchronizes the speeds of belt 11 and belt 12.

The composite image is transferred from transfer belt 12 to the image receptor, or paper. The transfer of the composite image from belt 12 to the receptor is not 100% efficient, so some residual toner particles will remain on belt 12 after the transfer. Therefore, in order to remove the residual toner the particles from belt 12, transfer belt cleaning knife 37 is engaged against transfer belt 12. These residual toner particles are then scraped from transfer belt 12 and, by gravity, fall into receptacle 40. The removed residual toner particles 42 are pictured within receptacle 40.

During color copying, transfer belt 12 will complete three revolutions for each copy made. For two of the three revolutions, transfer belt cleaning knife 37 will be in the disengaged mode. For the third revolution, cleaning knife 37 comes into contact with transfer belt 12 in the engaged mode.

Each time that cleaning knife 37 engages and disengages from transfer belt 12, a streak of unremoved toner is left on belt 12. Therefore, in the preferred embodiment, transfer belt cleaner knife 37 engages belt 12 for one full revolution, disengaging at the same place where it engaged. It is preferred that the streak appear outside of the imaging area on belt 12. Therefore, if belt 12 is a seamed belt, knife 37 engages and disengages belt 12 at the seam. However, in the preferred embodiment, belt 12 is a seamless belt so knife 37 engages and disengages belt 12 at a point where seam 63 is defined on belt 12.

Seam 63 is defined electronically within the internal electrical controls and its location is remembered and tracked through signals from optodetector pair 61b. When transfer belt cleaning knife 37 is disengaged from transfer belt 12, it leaves a streak of toner on belt 12. Cleaner knife 37 is disengaged from belt 12 at defined seam 63 thereby making that area useless for composite image building. Seam 52 on belt 11 must also necessarily be out of the imaging area of the belt. The rotation of belts 11 and 12 are therefore synchronized so that seam 52 which is outside of the imaging area of belt 11 contacts defined seam 63 which is outside of the imaging area of belt 12 thereby utilizing the maximum allowable space on the two belts.

Figure 5:
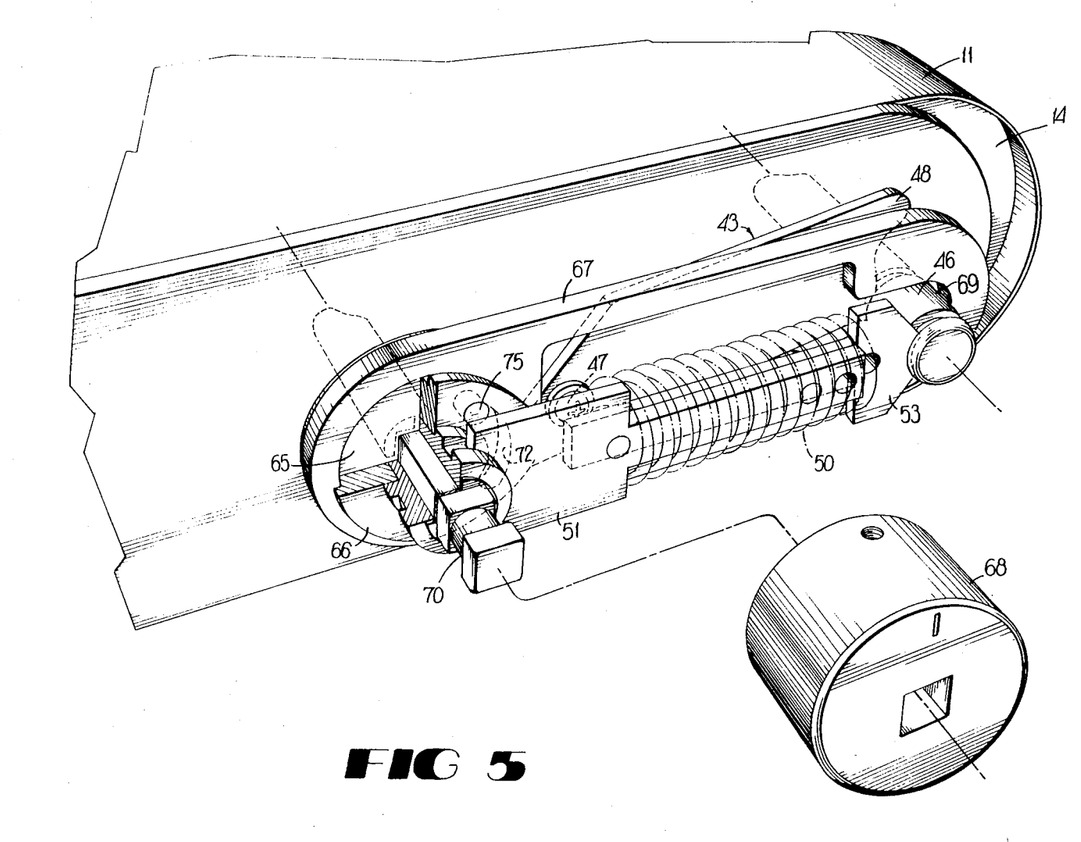
FIG. 5 is a perspective representation of the tensioning mechanism and belt release mechanism.

FIG. 5 is a perspective view of the spring and cam belt tensioning. Shaft 46 is the center axis of roller 14 around which belt 11 travels. Shaft 70 is a stationary shaft to give support to the tensioning devices. Linkages 51 and 53 together form an expandable bar between shaft 70 and shaft 46 with a spring between the linkages to keep tension upon shaft 46.

Positioning plate 67 surrounds the whole two-shaft arrangement. At one end it has a guide slot 69 in which shaft 46 can move in a lateral direction only. At the other end of plate 67 is an opening which contains release cam 66 and pegged release plate 65. Tensioning cam 43 is held in place by screw 47. This allows tensioning cam 43 to rotate around the axis of the center of screw 47. As belt 11 expands from age, wear or heat, spring 50 pushes out on linkage 53 thereby pushing shaft 46, and consequently roller 14 out to accommodate the expansion of belt 11. Tensioning cam 43 drops by gravity and prevents shaft 46 from compressing after expansion. Thus, spring 50 and tensioning cam 43 combine together to form the tension mechanism to keep belt 11 maintained under proper (or desired) tension.

Cam 43 is designed such that a line drawn from the center of shaft 46 to the contact point between shaft 46 and cam 43 will always be 8° above a line drawn from the same center of shaft 46 to the center of screw 47. Both shaft 46 and cam 43 are made of steel in the preferred embodiment. The vertical component of the friction force between steel cam 43 and steel shaft 46 will always exceed the vertical force component of the compression of the belt such that after gravity has caused cam 43 to drop into a new position, cam 43 cannot be forced upward by shaft 46. This prevents unwanted retraction of axis 46 of the roller, thus preventing slackening of the belt. Shaft 46 is a ⅜" diameter shaft and forms the axis of roller 14 on belt 11. Nose 48 on top of cam 43 prevents the tensioning cam 43 from falling too far. After the belt has expanded so far that the nose of the cam is resting on the shaft, the registration will become blurry and unclear due to the fact that the cam can no longer keep proper tension upon the belt. The loss of quality in the resultant copies indicates to the operator it is time to replace the belt.

FIG. 5 pictures the tensioning mechanism on the photoreceptor belt 11. Transfer belt 12 also contains a similar mechanism. Shaft 46 would be the axis of roller 56 and shaft 70 would be the axis of roller 57. In other words, roller 57 would remain stationary while proper (or desired) tension would be applied to roller 56.

FIG. 5 also shows the mechanism for releasing the tension from belt 11. Knob 68 is a manually-operated control which allows the operator to release tension from belt 11 to ease removal and change of belts. Knob 68 is connected to shaft 70 and is used to rotate pegged release plate 65. Release plate 65 sits behind lock release cam 66.

Figure 6A:
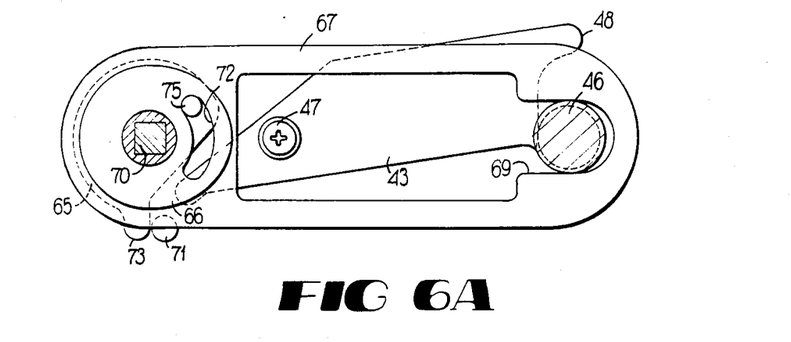
FIGS. 6A, 6B, and 6C show the operation of the belt release mechanisms in the preferred embodiment.
Figure 6B:
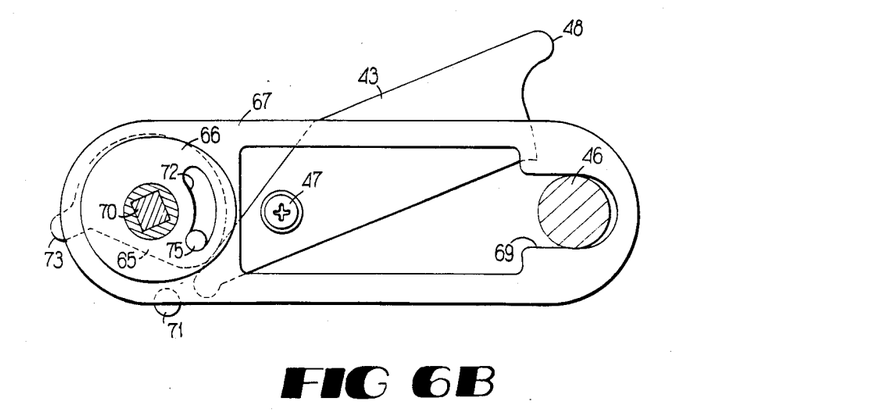
Figure 6C:
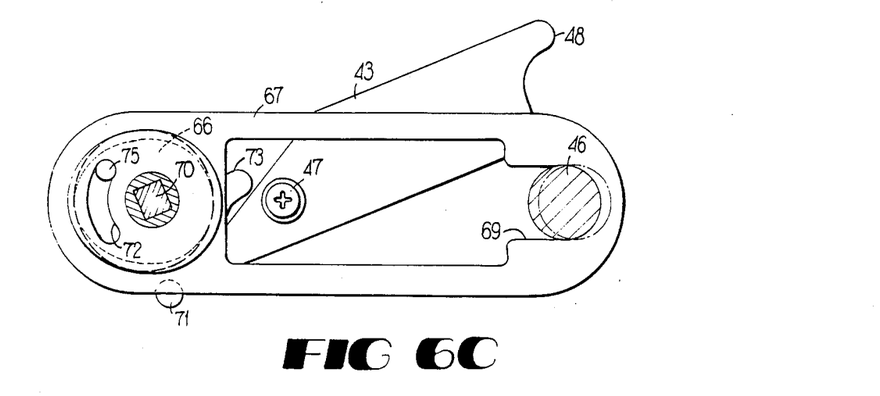

FIGS. 6A, 6B, and 6C show the operation of the release mechanism in the preferred mechanism. FIG. 6A shows the tensioning mechanism in normal operating position. Shaft 46 is urged back against cam 43 in order to keep proper (or correct) tension on the belt. Shaft 46 fits into guide slot 69 of retract plate 67. Shaft 70 is pictured with releasing cam 66 around it. Releasing cam 66 is not concentric with shaft 70. This is to allow for the camming action when the knob is being rotated. Shown in phantom behind releasing cam 66 is the pegged release plate 65. Peg 75 which is attached to release plate 65 is clearly shown in peg slot 72. Also, peg 71 is shown partially below retract plate 67. Nose 73 on release plate 65 will come into contact with 71 so that it cannot rotate any further in a counterclockwise direction.

To release the belt, knob 68 (shown in FIG. 5) is rotated in a clockwise direction. FIG. 6B shows the orientation of the various components after knob 68 has been rotated 90°. As knob 68 (FIG. 5) is rotated, it rotates shaft 70 in a clockwise direction. Shaft 70 is connected to release plate 65 and in FIG. 6B release plate 65 has been rotated 90° moving peg 75 to the lower end of slot 72 on releasing cam 66. During the 90° of rotation, release plate 65 has come into contact with the end of cam 43 opposite the portion contacting shaft 46. As releasing plate 65 is rotated further, cam 43 rotates about axis 47, disengaging cam 43 from shaft 46.

FIG. 6C shows the orientation of the various components after knob 68 has been rotated 270°. After the first 90° of rotation, peg 75 begins rotating releasing cam 66. In normal operating position, releasing cam 66 has its center to the right of the center of shaft 70. After peg 65 reaches the end of the track of releasing cam 66 and begins rotating cam 66, the majority of cam 66 which is to the right of shaft 70 is moved slowly over to the left side of shaft 70. This causes retract plate 67 to be moved to the left. As plate 67 moves to the left, retract slot 69 pulls shaft 46 to the left also. Since cam 43 has previously been moved out of the way, shaft 46 is free to be moved and to release the tension upon the belt. In phantom, the original position of shaft 46 is shown in FIG. 6C. Cam 66 and the hollow of release plate 67 are also clearly depicted.

Figure 7A:
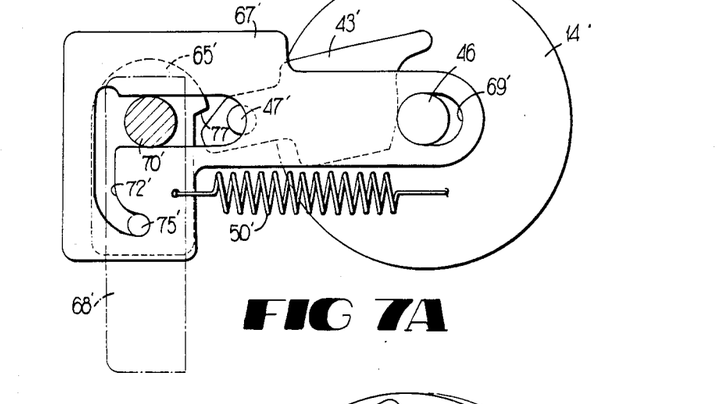
FIGS. 7A, 7B, and 7C show the operation of an alternate embodiment of the belt release mechanisms.
Figures 7B, 7C:
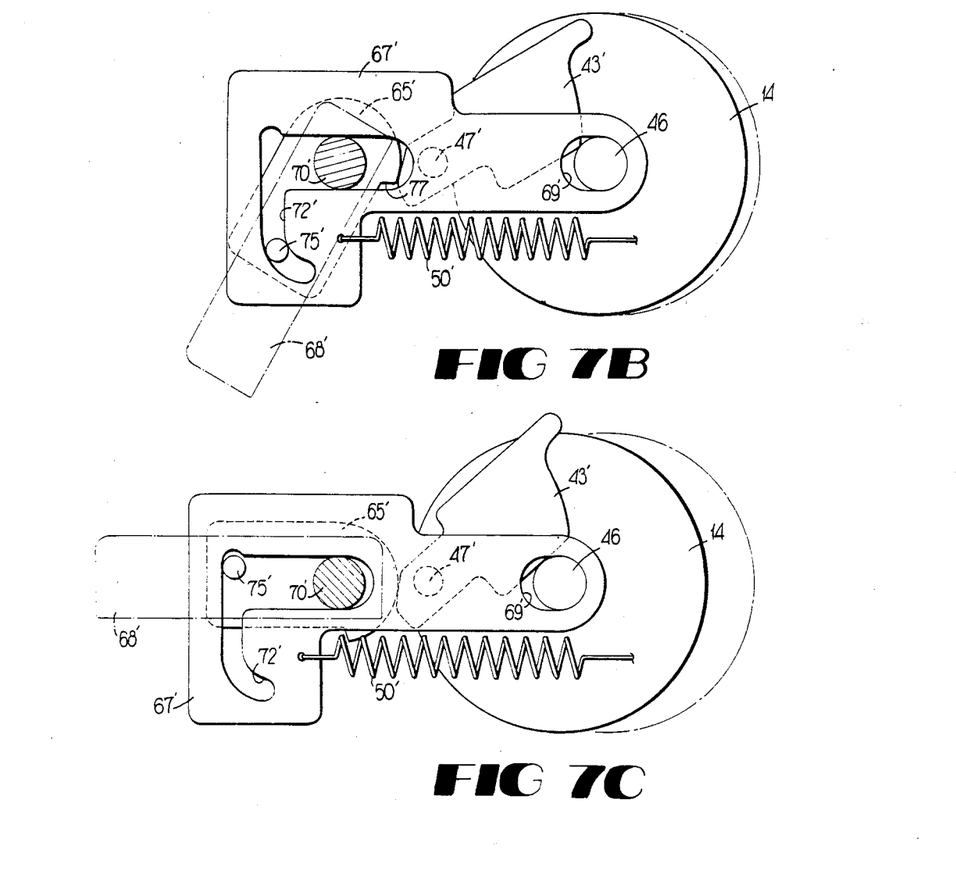

FIGS. 7A, 7B, and 7C show an alternate embodiment of the releasing mechanisms. Shaft 46 is the axis about which roller 14 rotates. Roller 14 in the picture could also be roller 56 on belt 12. Shaft 70' is connected to retract plate 65' and releasing lever 68'. Plate 65' has connected to it peg 75' which travels through slot 72' located in positioning plate 67'. Notch 75 on retract plate 65' is formed in such a way as to initially come into contact with cam 43'. FIG. 7A depicts the arrangement of the elements of the release mechanism during normal operation.

When the belt is to be removed, lever 68' is rotated in a clockwise fashion. FIG. 7B shows lever 65' after 30° of rotation. During this initial part of rotation, notch 75 of plate 65' has pushed downward on the part of cam 43' opposite shaft 46. This has caused cam 43' to be disengaged from shaft 46. Retract slot 69' of positioning plate 67' allows shaft 46 to move freely. The original position of roller 14 is shown in phantom. This is caused not only by the movement of retract piece 65' and therefore peg 75' within slot 72', but also by the tension force of spring 50'.

In FIG. 7C, lever 68' has been rotated a full 90°. After the initial 30° of rotation, slot 72' straightens out. Thus, as peg 75' rotates, it causes positioning plate 67' to shift to the left. This causes retract slot 69' to grab hold of shaft 46 and pull it to the left underneath cam 43. This releases the belt so that it can be removed and a new belt placed on. The original position of roller 14 before retraction is depicted in phantom.

From the foregoing description of the preferred embodiment, and alternate embodiments, it will be appreciated that the present invention overcomes the drawbacks of the prior art and meets the objects of the invention cited here and above. In view of the teachings of the specification, other alternative embodiments will suggest themselves to those skilled in the art and therefore the scope of the present invention is to be limited only by the claims below.

We claim:

1. In a print engine for use in a color electrophotographic system of the type including imaging means for selectively creating an image on a photosensitive receptor, the improvement comprising:

first transfer means carrying said receptor thereon and having a characteristic first length;

first reference means for detecting passage of a first predetermined location on said first transfer means past a first predetermined reference point and for providing a first reference signal in response thereto;

second transfer means having a characteristic second length, said second length nominally being an integer submultiple of said first length;

second reference means for detecting passage of a second predetermined location on said second transfer means past a second predetermined reference point and for providing a second reference signal in response thereto;

first drive means for driving said first transfer means about a plurality of rollers, each roller of said plurality of rollers having an axis of rotation;

second drive means for driving said second transfer means along a second predetermined path comprising a contact area wherein said second transfer means contacts said first transfer means and said first transfer means wraps around a particular one of said plurality of rollers; and control means connected to said first and second reference means for synchronizing said second drive means to said first drive means in response to said first and second reference signals such that said first transfer means and said second transfer means have a common predetermined angular velocity at said contact area, said predetermined angular velocity being measured with respect to said axis of rotation of said particular one of said plurality of rollers.

2. The improvement recited in claim 1 wherein:
said second transfer means has a bulk resistivity in the range of $10^8$ to $10^{12}$ ohms-centimeters.

3. The improvement as claimed in claim 1, wherein:
said first transfer means is a first rotating belt carrying a photosensitive belt thereon, said first rotating belt having a seam; and
said second transfer means is a second rotating seamless belt.

4. The improvement as claimed in claim 3, wherein said control means is responsive to said second reference signal such that an imaginary seam is defined on said second rotating seamless belt, said imaginary seam being synchronized through said control means to contact said seam of said first rotating belt.

* * * * *